United States Patent
Wang et al.

(10) Patent No.: US 11,396,478 B2
(45) Date of Patent: Jul. 26, 2022

(54) METHOD AND SYSTEM FOR PRODUCING LOW-ALKALINITY SULPHOALUMINATE CEMENT WITH NEW MINERAL SYSTEM USING STEEL SLAG

(71) Applicant: SHANDONG UNIVERSITY, Shandong (CN)

(72) Inventors: Xujiang Wang, Jinan (CN); Wenlong Wang, Jinan (CN); Jingwei Li, Jinan (CN); Yanpeng Mao, Jinan (CN); Chao Zhang, Jinan (CN); Changliang Wu, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 17/257,112

(22) PCT Filed: Feb. 28, 2020

(86) PCT No.: PCT/CN2020/077135
§ 371 (c)(1),
(2) Date: Dec. 30, 2020

(87) PCT Pub. No.: WO2020/211546
PCT Pub. Date: Oct. 22, 2020

(65) Prior Publication Data
US 2021/0130234 A1  May 6, 2021

(30) Foreign Application Priority Data
Apr. 15, 2019 (CN) .......................... 2019103004844

(51) Int. Cl.
| | | |
|---|---|---|
| *C04B 7/147* | (2006.01) | |
| *C04B 7/32* | (2006.01) | |
| *C04B 7/43* | (2006.01) | |
| *C04B 7/52* | (2006.01) | |

(52) U.S. Cl.
CPC .............. *C04B 7/147* (2013.01); *C04B 7/323* (2013.01); *C04B 7/434* (2013.01); *C04B 7/52* (2013.01)

(58) Field of Classification Search
CPC ........... C04B 7/52; C04B 7/147; C04B 7/323; C04B 7/434
See application file for complete search history.

(56) References Cited

FOREIGN PATENT DOCUMENTS

| CN | 103922622 A | 7/2014 | |
|---|---|---|---|
| CN | 106365477 A | 2/2017 | |
| CN | 106630703 A | 5/2017 | |
| CN | 106810294 A | 6/2017 | |
| CN | 106904849 A * | 6/2017 | ............. C04B 17/74 |
| CN | 106904849 A | 6/2017 | |
| CN | 107056102 A | 8/2017 | |
| CN | 109133684 A | 1/2019 | |
| CN | 109987866 A | 7/2019 | |
| EP | 3081546 A1 | 10/2016 | |
| EP | 3199500 A1 | 8/2017 | |

OTHER PUBLICATIONS

English translation of CN 106904849 A obtained via Espacenet. (Year: 2017).*
Apr. 28, 2020 Search Report issued in International Patent Application No. PCT/CN2020/077135.
Apr. 28, 2020 Written Opinion issued in International Application No. PCT/CN2020/077135.

* cited by examiner

*Primary Examiner* — Anthony J Green
(74) *Attorney, Agent, or Firm* — Oliff PLC

(57) ABSTRACT

A method and system for producing low-alkalinity sulphoaluminate cement with a new mineral system using steel slag. The method includes the following steps: evenly mixing and homogenizing ground steel slag with dry desulfurization gypsum, aluminum ash and carbide slag according to a set ratio; and conveying the homogenized raw meal to a rotary kiln for calcination to obtain cement clinker, where the calcination temperature is 1200° C.-1270° C., and the calcination time is 20-60 min; the alkalinity modulus of the homogenized cement raw meal is 0.81-0.9, and the $Fe_2O_3$ content is 8-13%. The method breaks through the requirements on contents of calcium, aluminum and iron in traditional sulphoaluminate cement production, and realizes application of a large amount of steel slag.

9 Claims, 1 Drawing Sheet

METHOD AND SYSTEM FOR PRODUCING LOW-ALKALINITY SULPHOALUMINATE CEMENT WITH NEW MINERAL SYSTEM USING STEEL SLAG

BACKGROUND

Technical Field

The present invention belongs to the field of solid waste utilization, and specifically relates to a method and system for producing low-alkalinity sulphoaluminate cement with a new mineral system using steel slag.

Related Art

Information disclosed in the related art section is merely for better understanding of the overall background of the present invention, and should not be taken as an acknowledgement or any suggestion that the information constitutes the prior art that is well known to those of ordinary skill in the art.

Steel slag is one kind of waste slags discharged in the steelmaking process, and mainly comes from oxides formed by oxidation of elements contained in molten iron and scrap steel, impurities carried by metallic charge, added slag-forming agents such as limestone, fluorite and silica, oxidants, desulfurization products, corroded furnace lining materials and the like. The quantity of steel slag is about 15%-20% of the steel output, and the main components are oxides of calcium, iron, silicon, magnesium, aluminum, manganese, phosphorus and the like. The main way to use steel slag in China is to recycle it as a flux replacing lime and feed it back into a blast furnace or a sintering furnace as a raw material for ironmaking by iron and steel companies, or use it for road subgrade, railway subgrade and soil improvement, or use as an admixture of cement and concrete. However, the amount of steel slag used in the above utilization ways is limited. With the development of the steel industry, the amount of steel slag is increasing day by day, and many steel plants are already full of steel slag. Nevertheless, the extension of slag dumps will not only occupy valuable arable land and farmland, but also cause secondary pollution of air and water quality and severely damage the ecological environment.

In traditional production of sulphoaluminate cement, the main raw materials are bauxite, limestone and gypsum. Sulphoaluminate cement is prepared through a series of steps including raw meal selection, batching, crushing, grinding, calcination (at 1300-1350° C.), clinker grinding and the like. The main mineral phases of sulphoaluminate cement clinker include calcium sulphoaluminate, dicalcium silicate and iron phases. $Al_2O_3$ generally accounts for 28-40 wt % in the clinker, and high-grade bauxite with the $Al_2O_3$ content being greater than 55 wt % is usually required as a raw material. Moreover, in the traditional process, in order to ensure complete solid-phase reaction and formation of effective mineral phases, it is necessary to ensure a high CaO content in the raw meal, and control the alkalinity modulus of the raw meal to be 0.95-0.98. In order to ensure the quantity and quality of calcium sulphoaluminate produced, the $Fe_2O_3$ content usually needs to be controlled under 3%. In addition, in traditional production of the sulphoaluminate cement, it is usually necessary to avoid the presence of gehlenite in clinker minerals, because gehlenite has no hydraulic properties. Therefore, it is necessary to ensure a sufficiently high calcium oxide content in the raw meal to achieve a sufficiently high alkalinity modulus.

SUMMARY

In order to resolve the technical problems in the prior art, the objective of the present invention is to provide a method and system for producing low-alkalinity sulphoaluminate cement with a new mineral system using steel slag. The method breaks through the requirements on contents of calcium, aluminum and iron in traditional sulphoaluminate cement production, and the clinker mineral system is significantly different from that of the traditional sulphoaluminate cement clinker. The method can realize application of a large amount of steel slag.

In order to resolve the above technical problems, the technical solution of the present invention is:

a method for producing low-alkalinity sulphoaluminate cement with a new mineral system using steel slag, including the following steps:

evenly mixing and homogenizing ground steel slag with dry desulfurization gypsum, aluminum ash and carbide slag according to a set ratio, where an alkalinity modulus of raw meal is 0.81-0.9, the homogenized raw meal contains 32-40 parts by weight of CaO, 6-12 parts by weight of $SiO_2$, 20-28 parts by weight of $Al_2O_3$, 8-13 parts by weight of $Fe_2O_3$, and 10-18 parts by weight of $SO_3$, and an alumina-sulfur ratio is 1.3-2.0; and conveying the homogenized raw meal to a rotary kiln for calcination to obtain cement clinker, where the calcination temperature is 1200° C.-1270° C., and the calcination time is 20-60 min.

In the traditional production process of sulphoaluminate cement, if the content of $Fe_2O_3$ in the cement raw meal is too high, less effective tetracalcium aluminoferrite will be formed, and the characteristics of early strength and high strength of sulphoaluminate cement cannot be maintained. In order to ensure the quantity and quality of calcium sulphoaluminate produced, the $Fe_2O_3$ content in the cement raw meal usually needs to be controlled under 3%, which means that only a small amount of iron-containing mineral can be added to the cement raw meal. However, the content of $Fe_2O_3$ in steel slag is as high as about 25%. If the addition of $Fe_2O_3$ is strictly controlled, the proportion of steel slag blended in the process of preparing sulphoaluminate cement will be greatly restricted.

In the homogenized raw meal, the calcium content and aluminum content are lower than those of the traditional process, while the iron content and sulfur content are significantly higher than those of the traditional process. By adopting the process of the present invention, the content of $Al_2O_3$ in the cement raw meal can be lower than that of the traditional production process, and the content of $Fe_2O_3$ can be higher than that of the traditional production process, so that low-grade aluminum-containing solid waste and high-iron solid waste can be used for producing sulphoaluminate cement, thereby expanding the scope of application of the process.

It is found that if a large amount of steel slag is used as a raw material of sulphoaluminate cement, by controlling key parameters such as raw meal chemical composition and the alumina-sulfur ratio, the requirements on the alkalinity modulus in the traditional sulphoaluminate cement production process can be broken through, and the alkalinity modulus can be reduced to 0.81-0.9. The reduction of the alkalinity modulus reduces the content of CaO in the cement raw meal, thereby reducing the dependence on limestone and other raw materials with high calcium content.

However, if the content of CaO in the cement raw meal is low, solid phase reaction during the calcination process is likely to be incomplete, resulting in a large amount of non-hydraulic materials such as gehlenite, and affecting the performance of the sulphoaluminate cement. It is found through repeated experiments that if the requirements on the alumina-sulfur ratio in traditional production is broken through during the batching process, part of the gehlenite can be prompted to convert into effective highly-active minerals, thereby ensuring the mechanical properties of the sulphoaluminate cement. In addition, a suitable alumina-sulfur ratio can also induce solid phase reaction in the raw meal calcination process, so that Fe can replace a certain amount of Al to form calcium sulfoaluminate ferrite. When serving as a component of sulphoaluminate cement, calcium sulfoaluminate ferrite can effectively replace calcium sulphoaluminate and play a key role in the early strength and high strength of cement. Therefore, different from a conventional clinker mineral system mainly including calcium sulphoaluminate, dicalcium silicate and a small amount of iron of sulphoaluminate cement, the clinker mineral system of the present invention includes calcium sulfoaluminate, calcium sulfoaluminate ferrite and gehlenite. Although there is a certain proportion of gehlenite in the system, the performance of the cement can be fully guaranteed because a sufficient part of high-performance hydraulic minerals can be ensured.

In addition, when the cement raw meal with the ingredients is calcined, the optimal temperature for calcination is 1200° C.-1270° C., which is much lower than the calcination temperature for traditional calcium sulphoaluminate cement, and is conducive to energy saving and environmental protection.

In some embodiments, the homogenized raw meal contains 36-38 parts by weight of CaO, 6-8 parts by weight of $SiO_2$, 22-24 parts by weight of $Al_2O_3$, 10-13 parts by weight of $Fe_2O_3$, and 15-17 parts by weight of $SO_3$.

In some embodiments, the alumina-sulfur ratio of the homogenized raw meal is 1.4-1.6.

In some embodiments, the fineness of outlet ground steel slag meets that a sieve residue of a 0.08 mm square hole sieve is within 10%.

The sieve residue is the mass percentage of the part that remains on a sieve taking up a total mass of a powdery material after a certain mass of powdery material is sieved on a standard sieve, and is an expression method of the fineness of the powdery material.

In some embodiments, the fineness of outlet ground steel slag meets that the sieve residue of the 0.08 mm square hole sieve is 4%-8%.

In some embodiments, the homogenization is grinding homogenization or homogenization treatment in a homogenization equipment.

Homogenization is a process of reducing the fluctuation amplitude of chemical components of a material and making the chemical components of the material uniform by adopting certain technological measures.

In some embodiments, main mineral phases in the cement clinker include calcium sulphoaluminate, gehlenite and calcium sulfoaluminate ferrite, accounting for 40-65%, 5-20% and 10-25% by mass respectively.

The second objective of the present invention is to provide a system for producing low-alkalinity sulphoaluminate cement having a new mineral system from steel slag, including a dryer, a grinder, a batching equipment, a homogenization equipment and a rotary kiln;

the dryer is configured to dry steel slag, desulfurization gypsum, aluminum ash and carbide slag;

the dried steel slag is ground in the grinder;

the desulfurization gypsum, the aluminum ash, the carbide slag and other materials are added into the grinder according to a set ratio for homogenization treatment, or the steel slag, the desulfurization gypsum, the aluminum ash and the carbide slag are mixed in the batching equipment according to the set ratio, and then are subjected to the homogenization treatment in the homogenization equipment; and the homogenized cement raw meal is calcined in the rotary kiln to obtain the cement clinker.

Beneficial Effects of the Present Invention

The present invention breaks through the limitation of traditional theory and technology on the alkalinity modulus and the calcium-sulfur ratio, and reduces the contents of aluminum oxide and calcium oxide in raw meal. The present invention can directionally induce solid phase reaction in the clinker production process, so that Fe can replace a certain amount of Al to produce calcium sulfoaluminate ferrite, thereby improving the performance of sulphoaluminate cement, greatly increasing the iron oxide content in the ingredients, and using a large amount of steel slag. The present invention can also directionally induce part of the gehlenite to react to form highly-active minerals, and ensure the early strength and high strength characteristics of the sulphoaluminate cement. In addition, because the content of calcium oxide in the ingredients is reduced, dependence on high-calcium raw materials such as limestone can be reduced.

BRIEF DESCRIPTION OF THE DRAWINGS

The accompanying drawings that constitute a part of the present invention are used for providing a further understanding of the present invention. Exemplary embodiments of the present invention and the description of the embodiments are used for explaining the present invention and do not constitute any inappropriate limitation to the present invention.

DETAILED DESCRIPTION

It should be noted that, the following detailed descriptions are all exemplary, and are intended to provide further descriptions of the present invention. Unless otherwise specified, all technical and scientific terms used herein have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is intended to include the plural form, unless the context clearly indicates otherwise. In addition, it should be further understood that terms "comprise" and/or "include" used in this specification indicate that there are features, steps, operations, equipments, assemblies, and/or combinations thereof.

Embodiment 1

Figure 1:
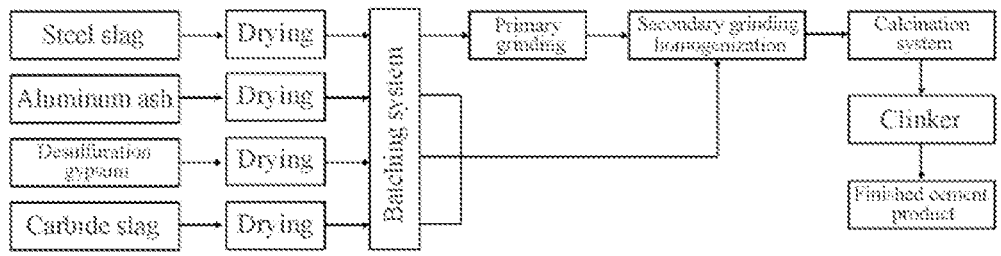
FIG. 1 is a process flowchart of Embodiment 1 of a production system of the present invention.

As shown in FIG. 1, a system for producing sulphoaluminate cement from steel slag includes a dryer, a primary grinder, a secondary grinding homogenizer, a batching equipment and a rotary kiln. The dryer is configured to dry steel slag, desulfurization gypsum, aluminum ash and carbide slag; the dried steel slag is quantified by the batching equipment and is then ground in the primary grinder; the desulfurization gypsum, the aluminum ash and the carbide slag are mixed in the batching equipment according to a set ratio, and are then homogenized and ground with the steel slag in the secondary grinding homogenizer; and the homogenized cement raw meal is calcined in the rotary kiln to obtain cement clinker.

Figure 3:
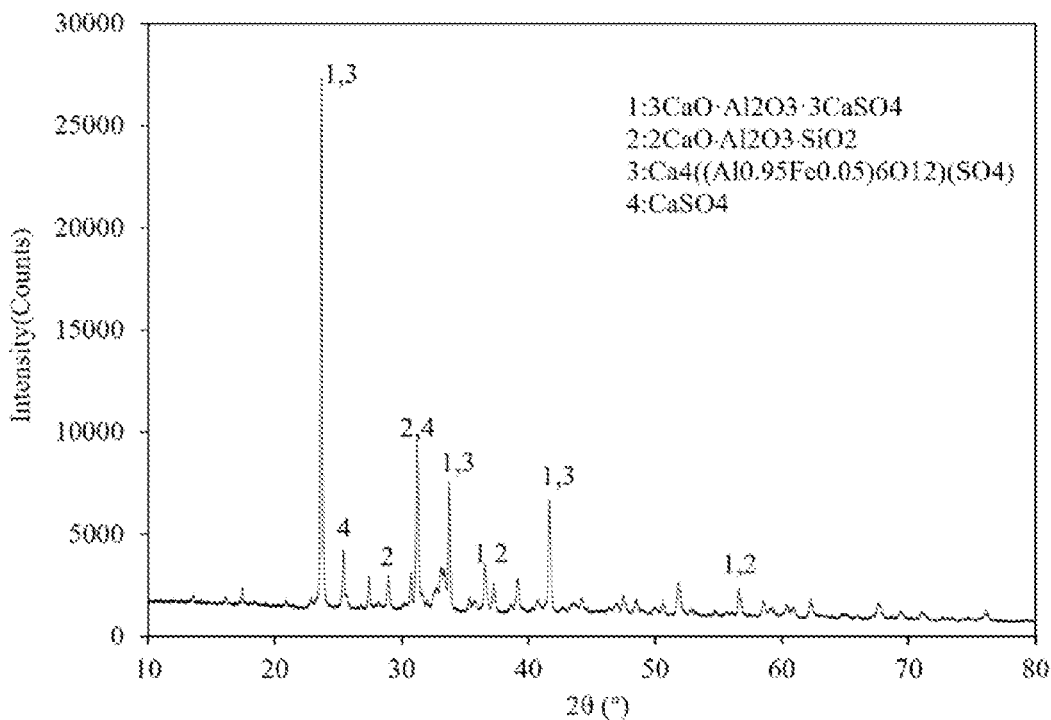
FIG. 3 is an X-ray diffraction pattern of cement clinker prepared in Embodiment 1 of the present invention.

Firstly, all raw materials are dried, and the steel slag obtained by drying is ground. The fineness of the outlet ground steel slag meets that a sieve residue of a 0.08 mm square hole sieve is within 10%. Then the desulfurization gypsum, the aluminum ash, the carbide slag and other materials are mixed according to the set ratio and added to the grinder to be ground and homogenized with the steel slag. An alkalinity modulus of the homogenized cement raw meal is 0.81, and the homogenized raw meal contains 34 parts by weight of CaO, 6 parts by weight of $SiO_2$, 25 parts by weight of $Al_2O_3$, 10 parts by weight of $Fe_2O_3$, and 17 parts by weight of $SO_3$. Afterwards, the homogenized materials are conveyed to the rotary kiln for calcination to obtain the cement clinker, the calcination temperature is 1250° C., and the calcination time is 30 min. The main mineral composition of the cement clinker is shown in Table 1, and an X-ray diffraction pattern of the cement clinker is shown in FIG. 3. 3% gypsum is added to the cement clinker, and the mixture is ground in a cement grinder to obtain the sulphoaluminate cement. The mechanical properties of the obtained sulphoaluminate cement are shown in Table 8. The strength test standard is based on GB 20472-2006 *Sulphoaluminate Cement*.

TABLE 1

Main mineral composition of cement clinker (wt %)

| Component | Calcium sulphoaluminate | Gehlenite | Calcium sulfoaluminate ferrite |
|---|---|---|---|
| Cement clinker | 56 | 20 | 17 |

Embodiment 2

Firstly, all raw materials are dried, and steel slag obtained by drying is ground. The fineness of the outlet ground steel slag meets that a sieve residue of a 0.08 mm square hole sieve is within 10%. Then desulfurization gypsum, aluminum ash, carbide slag and other materials are mixed according to a set ratio and added to the grinder to be ground and homogenized with the steel slag. An alkalinity modulus of the homogenized cement raw meal is 0.9, and the homogenized raw meal contains 38 parts by weight of CaO, 8 parts by weight of $SiO_2$, 22 parts by weight of $Al_2O_3$, 13 parts by weight of $Fe_2O_3$, and 15 parts by weight of $SO_3$. Afterwards, the homogenized materials are conveyed to the rotary kiln for calcination to obtain cement clinker, the calcination temperature is 1220° C., and the calcination time is 25 min. The main mineral composition of the cement clinker is shown in Table 2. 5% gypsum is added to the cement clinker, and the mixture is ground in a cement grinder to obtain sulphoaluminate cement. The mechanical properties of the obtained sulphoaluminate cement are shown in Table 8. The strength test standard is based on GB 20472-2006 *Sulphoaluminate Cement*.

TABLE 2

Main mineral composition of cement clinker (wt %)

| Component | Calcium sulphoaluminate | Gehlenite | Calcium sulfoaluminate ferrite |
|---|---|---|---|
| Cement clinker | 62 | 6 | 23 |

Embodiment 3

Figure 2:
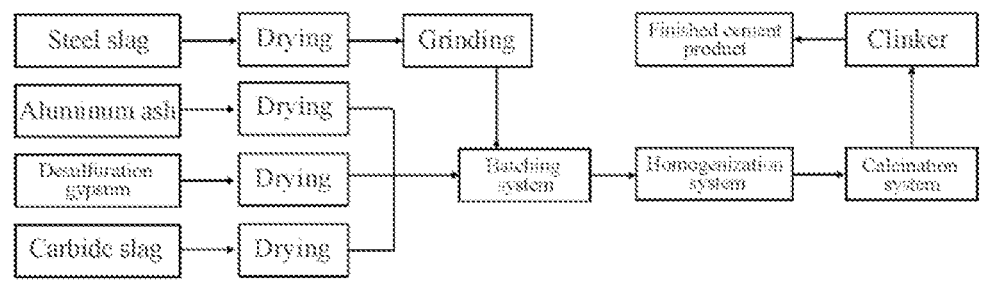
FIG. 2 is a process flowchart of Embodiment 2 of the production system of the present invention.

As shown in FIG. 2, a system for producing sulphoaluminate cement from steel slag includes a dryer, a grinder, a batching equipment, a homogenization equipment and a rotary kiln. The dryer is configured to dry steel slag, desulfurization gypsum, aluminum ash and carbide slag; the dried steel slag is ground in the grinder; the steel slag, the desulfurization gypsum, the aluminum ash and the carbide slag are mixed in the batching equipment according to a set ratio, and then the mixture is homogenized in the homogenization equipment; and the homogenized cement raw meal is calcined in the rotary kiln to obtain cement clinker.

Firstly, all raw materials are dried, and the steel slag obtained by drying is ground. The fineness of the outlet ground steel slag meets that a sieve residue of a 0.08 mm square hole sieve is within 10%. Then the desulfurization gypsum, the aluminum ash, the carbide slag and other materials are mixed according to the set ratio and the mixture is homogenized. An alkalinity modulus of the homogenized cement raw meal is 0.85, and the homogenized raw meal contains 36 parts by weight of CaO, 10 parts by weight of $SiO_2$, 24 parts by weight of $Al_2O_3$, 10 parts by weight of $Fe_2O_3$, and 15 parts by weight $SO_3$. Afterwards, the homogenized material is conveyed to the rotary kiln for calcination to obtain the cement clinker, the calcination temperature is 1230° C., and the calcination time is 50 min. The main mineral composition of the cement clinker is shown in Table 3. 4% gypsum is added to the cement clinker, and the mixture is ground in a cement grinder to obtain the sulphoaluminate cement. The mechanical properties of the obtained sulphoaluminate cement are shown in Table 8. The strength test standard is based on GB 20472-2006 *Sulphoaluminate Cement*.

TABLE 3

Main mineral composition of cement clinker (wt %)

| Component | Calcium sulphoaluminate | Gehlenite | Calcium sulfoaluminate ferrite |
|---|---|---|---|
| Cement clinker | 65 | 13 | 19 |

Comparative Example 1

The difference from Embodiment 1 is that the homogenized raw meal contains 37 parts by weight of CaO, 6 parts by weight of $SiO_2$, 20 parts by weight of $Al_2O_3$, 10 parts by weight of $Fe_2O_3$, and 19 parts by weight of $SO_3$. Others are the same as those in Embodiment 1. The main mineral composition of the prepared cement clinker is shown in Table 4, and the properties of the prepared sulphoaluminate cement are shown in Table 8.

TABLE 4

| | Main mineral composition of cement clinker (wt %) | | | |
|---|---|---|---|---|
| Component | Calcium sulphoaluminate | Gehlenite | Calcium sulfoaluminate ferrite | Anhydrous calcium sulfate |
| Cement clinker | 49 | 5 | 15 | 9 |

Comparative Example 2

The difference from Embodiment 1 is that the homogenized raw meal contains 32 parts by weight of CaO, 7 parts by weight of $SiO_2$, 30 parts by weight of $Al_2O_3$, 10 parts by weight of $Fe_2O_3$, and 15 parts by weight of $SO_3$. Others are the same as those in Embodiment 1. The main mineral composition of the prepared cement clinker is shown in Table 5, and the properties of the prepared sulphoaluminate cement are shown in Table 8.

TABLE 5

| | Main mineral composition of cement clinker (wt %) | | |
|---|---|---|---|
| Component | Calcium sulphoaluminate | Gehlenite | Calcium sulfoaluminate ferrite |
| Cement clinker | 28 | 53 | 7 |

Comparative Example 3

The difference from Embodiment 1 is that the calcination temperature is 1300° C., and others are the same as those in Embodiment 1. The main mineral composition of the prepared cement clinker is shown in Table 6, and the properties of the prepared sulphoaluminate cement are shown in Table 8.

TABLE 6

| | Main mineral composition of cement clinker (wt %) | | |
|---|---|---|---|
| Component | Calcium sulphoaluminate | Gehlenite | Calcium sulfoaluminate ferrite |
| Cement clinker | 56 | 21 | 15 |

Comparative Example 4

The difference from Embodiment 1 is that the calcination temperature is 1180° C., and others are the same as those in Embodiment 1. The main mineral composition of the prepared cement clinker is shown in Table 7, and the properties of the prepared sulphoaluminate cement are shown in Table 8.

TABLE 7

| | Main mineral composition of cement clinker (wt %) | | |
|---|---|---|---|
| Component | Calcium sulphoaluminate | Gehlenite | Calcium sulfoaluminate ferrite |
| Cement clinker | 49 | 29 | 6 |

TABLE 8

| | Compressive/flexural strength (unit: MPa) | | |
|---|---|---|---|
| No./Age d | 1 d | 3 d | 28 d |
| Embodiment 1 | 41.2/6.5 | 52.3/6.9 | 67.9/7.5 |
| Embodiment 2 | 44.8/6.7 | 57.2/7.1 | 75.1/7.8 |
| Embodiment 3 | 42.1/6.5 | 53.6/6.8 | 70.2/7.6 |
| Comparative Example 1 | 27.1/4.8 | 32.7/5.2 | 42.3/5.9 |
| Comparative Example 2 | 17.4/2.9 | 22.5/3.9 | 28.7/4.5 |
| Comparative Example 3 | 39.7/6.4 | 51.3/7.0 | 65.8/7.3 |
| Comparative Example 4 | 27.9/5.0 | 35.3/5.3 | 42.8/5.9 |

The foregoing descriptions are merely preferred embodiments of the present invention, but are not intended to limit the present invention. A person skilled in the art may make various modifications and changes to the present invention. Any modification, equivalent replacement, or improvement made without departing from the spirit and principle of the present invention is to be fall within the protection scope of the present invention.

What is claimed is:

1. A method for producing sulphoaluminate cement from steel slag, comprising the following steps:
    evenly mixing and homogenizing ground steel slag with dry desulfurization gypsum, aluminum ash and carbide slag according to a set ratio to obtain a homogenized raw meal;
    conveying the homogenized raw meal to a rotary kiln for calcination to obtain cement clinker, wherein the calcination temperature is 1200° C.–1270° C., and the calcination time is 20-60 min,
    wherein
    an alkalinity modulus of the homogenized raw meal is 0.81-0.9,
    the homogenized raw meal contains 32-40 parts by weight of CaO, 6-12 parts by weight of $SiO_2$, 20-28 parts by weight of $Al_2O_3$, 8-13 parts by weight of $Fe_2O_3$, and 10-18 parts by weight of $SO_3$, and
    the homogenized raw meal has an alumina-sulfur ratio of 1.3-2.0.

2. The method of claim 1, wherein the homogenized raw meal contains 32-35 parts by weight of CaO, 6-12 parts by weight of $SiO_2$, 20-25 parts by weight of $Al_2O_3$, 10-13 parts by weight of $Fe_2O_3$, and 10-15 parts by weight of $SO_3$.

3. The method of claim 1, wherein the alumina-sulfur ratio of the homogenized raw meal is 1.3-1.8.

4. The method of claim 1, wherein the ground steel slag has a fineness that meets that a sieve residue of a 0.08 mm square hole sieve is less than 10%.

5. The method of claim 4, wherein the fineness of the ground steel slag meets that the sieve residue of the 0.08 mm square hole sieve is from 4% to 8%.

6. The method of claim 1, wherein the homogenizing comprises is grinding homogenization or homogenization treatment in homogenization equipment.

7. The method of claim 1, wherein main mineral phases in the cement clinker comprise calcium sulphoaluminate, gehlenite and calcium sulfoaluminate ferrite, accounting for 40-65%, 5-20% and 10-25% by mass respectively of the cement clinker.

8. The method of claim 7, wherein the main mineral phases in the cement clinker comprise calcium sulphoaluminate, gehlenite and calcium sulfoaluminate ferrite, accounting for 50-65%, 5-20% and 15-25% by mass respectively of the cement clinker.

9. The method of claim 1, further comprising a step of mixing and grinding the cement clinker and gypsum to prepare the sulphoaluminate cement.

* * * * *